United States Patent
Ramasubramanian et al.

(10) Patent No.: US 8,847,819 B2
(45) Date of Patent: Sep. 30, 2014

(54) CLOCK DRIFT PROFILE DETERMINATION IN NAVIGATION SYSTEM RECEIVERS

(75) Inventors: Karthik Ramasubramanian, Bangalore (IN); Jawaharlal Tangudu, Bangalore (IN)

(73) Assignee: Texas Instruments Incorporated, Dallas, TX (US)

( * ) Notice: Subject to any disclaimer, the term of this patent is extended or adjusted under 35 U.S.C. 154(b) by 274 days.

(21) Appl. No.: 13/280,524

(22) Filed: Oct. 25, 2011

(65) Prior Publication Data

US 2013/0099967 A1   Apr. 25, 2013

(51) Int. Cl.
*G01S 19/23* (2010.01)

(52) U.S. Cl.
CPC .................................... *G01S 19/23* (2013.01)
USPC ..................................................... 342/357.62

(58) Field of Classification Search
USPC ..................................................... 342/357.62
See application file for complete search history.

(56) References Cited

U.S. PATENT DOCUMENTS

| | | |
|---|---|---|
| 2003/0107513 A1 | 6/2003 | Abraham et al. |
| 2003/0207681 A1 | 11/2003 | Rowitch |
| 2004/0092228 A1* | 5/2004 | Force et al. ...................... 455/19 |
| 2005/0200347 A1* | 9/2005 | Agoston et al. ............ 324/76.15 |
| 2006/0055595 A1 | 3/2006 | Bustamante et al. |
| 2009/0041104 A1* | 2/2009 | Bogdan ......................... 375/226 |
| 2009/0079486 A1 | 3/2009 | Lee et al. |

\* cited by examiner

*Primary Examiner* — Harry Liu
(74) *Attorney, Agent, or Firm* — Ronald O. Neerings; Frederick J. Telecky, Jr.

(57) ABSTRACT

Navigation system receiver, and test circuits and methods for determining drift profile of a receiver clock in the navigation system receiver are disclosed. In an embodiment, the navigation system receiver includes a clock source configured to generate a receiver clock for the navigation system receiver and a test circuit. The test circuit is configured to facilitate determination of a drift profile associated with the receiver clock based on detection and tracking of a test signal received by the test circuit, where the test signal comprises at least one continuous wave (CW) signal.

20 Claims, 4 Drawing Sheets

CLOCK DRIFT PROFILE DETERMINATION IN NAVIGATION SYSTEM RECEIVERS

TECHNICAL FIELD

The present disclosure generally relates to clock drift profile determination in navigation system receivers.

BACKGROUND

An operation of navigation system receivers, such as Global Positioning System (GPS) receivers, Globalnaya Navigatsionnay Sputnikovaya Sistema (GLONASS) receivers and Galileo™ receivers, is to acquire and track navigation satellite signals so that range measurements can be made between several satellites and these receivers, in order to compute locations for the receivers. Such navigation system receivers are very sensitive to clock drift, and, therefore, characterization of clock drift associated with the clocks in the navigation system receivers is important during integration of the navigation system receivers into electronic device platforms or afterwards.

SUMMARY

Test Circuits and methods for determining drift profile of a receiver clock in a navigation system receiver are disclosed. In an embodiment, the navigation system receiver includes a clock source and a test circuit. The clock source is configured to generate a receiver clock for the navigation system receiver. The test circuit is configured to facilitate determination of a drift profile (i.e., the profile of how the clock frequency changes over time) associated with the receiver clock based on detection and tracking of a test signal received by the test circuit, where the test signal comprises at least one continuous wave (CW) signal.

In some embodiments, the test circuit comprises a frequency detection module that is operable on received samples of a test signal and is configured to provide a frequency domain representation of the test signal for calculating an initial frequency offset associated with the receiver clock. The test circuit also comprises a tracking unit for tracking a frequency or a phase parameter of the test signal with respect to time using the initial frequency offset associated with the receiver clock. The tracked parameter is utilized for facilitating determination of the drift profile associated with the receiver clock.

DETAILED DESCRIPTION

Pursuant to an exemplary scenario, navigation system receivers such as GPS receivers are very sensitive to clock drift, and, therefore, characterization and/or determination of the receiver clock drift is important during GPS receiver integration into an electronic device platform. Even small drifts of the order of 10-20 parts-per-billion/second (ppb/s) can cause significant performance degradation (for example, sensitivity loss) in high-sensitivity GPS receivers. The received GPS signal strength is very weak and the receiver needs to process the signal, through a process of correlation and accumulation, for long durations extending to several milliseconds or seconds to recover the information. Due to this reason, even a small drift in the receiver clock can cause performance degradation. Therefore, it is important to characterize/determine the drift profile and optimize the board layout of the GPS receivers in the electronic device platforms or take other action.

Moreover, in one exemplary scenario, navigation system receivers are configured to use a temperature compensated crystal oscillator (TCXO) as the clock source, and the performance of the navigation system receiver suffers from temperature dependent residual errors. Accordingly, factors such as characterization of TCXO clock drift, TCXO selection, placement and routing become important for consideration while integrating GPS receivers into electronic device platforms such as phone platforms. Such TCXO drifts are characterized by using external equipment, such as a modulation analyzer or spectrum analyzer. These equipments are connected to the navigation system receivers for analyzing the receiver clock drift. However, these equipments are difficult to use in final form-factor phone platforms that are typically very small in size, and such characterizations of receiver clock drift are time and effort intensive. Further, such characterizations are difficult to achieve during the factory production stage of navigation system receivers, or during stages such as bench characterization.

In some embodiments, the navigation system receiver is in close proximity to other transceivers, for example, wireless LAN, Bluetooth, and the like, in the same electronic platform. The operation of these other transceivers can result in rapid temperature changes in the electronic platform due to heating effects, which results in clock drift that can impact the performance of the navigation system receiver. Therefore, it is important to characterize/determine the clock drift profile under various simultaneous operation scenarios of the navigation system receiver with the other transceivers.

Various embodiments of the present technology provide solutions for integrating a test circuit in a navigation system receiver that is capable of characterizing/determining drift associated with receiver clock to overcome the above and other limitations, in addition to providing currently unavailable benefits. For instance, various embodiments provide navigation system receivers that incorporate test circuits that can be invoked for determining the drift profile associated with receiver clock in the navigation system receivers. Various embodiments of the present technology are herein disclosed in conjunction with FIGS. 1 to 4.

Figure 1:
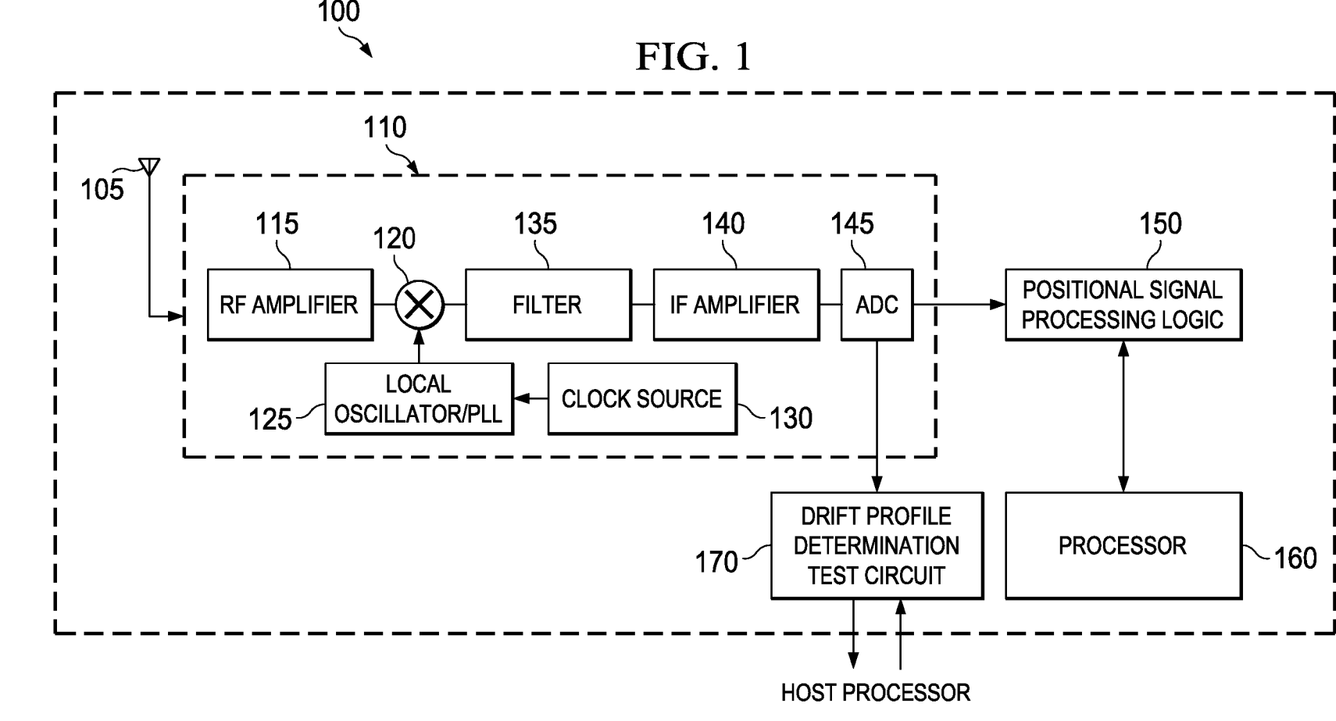
FIG. 1 is a block diagram of a navigation system receiver according to an embodiment.

FIG. 1 is a block diagram of an exemplary navigation system receiver 100 capable of facilitating determination of a drift profile of a receiver clock, according to an embodiment. The navigation system receiver 100 is capable of receiving positional, timing and other navigational information from the navigation satellites such as Global Navigation Satellite Systems (GNSS) systems. Examples of the navigation system receiver 100 include, but are not limited to, a global positioning system (GPS) receiver, a Globalnaya Navigatsionnay Sputnikovaya Sistema (GLONASS) receiver, a Galileo™ receiver, and other navigation system receivers. It should be noted that the details of the diagram of the receiver 100 are provided merely by way of illustration, and other embodiments may contain fewer or more components, and corresponding interconnections.

An antenna 105 is configured to receive multiple satellite signals from GNSS satellites in one or more satellite systems such as GPS, GLONASS, Galileo and the like. In an exemplary embodiment, the front-end processing block 110 can be designed to operate with code division multiple access (CDMA), such as GPS or Galileo, as well as frequency division multiplexed (FDM), such as GLONASS, types of GNSS satellite signals. In accordance with one embodiment, the combination of all satellite signals is referred to as a "received signal" or "radio frequency (RF) signal". The antenna 105 is configured to provide the RF signal to the front-end processing block 110. The front-end processing block 110 is configured in a variety of ways, and the front-end processing block 110 is shown as an example and can include more components than the components shown in FIG. 1, and other interconnections thereof. In this embodiment, the front-end processing block 110 includes an RF amplifier 115 configured to access signals from the antenna 105 that amplifies the RF signal. In one example, the RF amplifier 115 can be a low-noise amplifier. In some embodiments, the RF amplifier 115 receives signals from the antenna 105 through high performance filters such as a Surface Acoustic Wave (SAW) filter along with a matching network block (not shown).

The front-end processing block 110 is configured to perform one or more levels of down-conversion to lower a carrier frequency of the RF signal to a lower frequency (e.g., intermediate frequency (IF)). For example, the receiver 100 includes a mixer 120 configured to convert the RF signal to an IF signal. The mixer 120 uses a signal from a local Oscillator (LO)/Phase Locked Loop (PLL) 125 to convert the RF signal to the IF signal. The LO/PLL 125 typically receives a clock signal from a clock source 130 and generates a local oscillator signal that is provided to the mixer 120. Examples of the clock source 130 include, but are not limited to, a temperature compensated crystal oscillator (TCXO), a crystal oscillator, or a crystal coupled to an oscillator inside the navigation system receiver 100. A filter 135 filters the IF signal that is further amplified by an IF amplifier 140. In an embodiment, the output of the IF amplifier 140 is provided to an analog-to-digital converter (ADC) 145. The ADC 145 is configured to convert the received IF signal to digital samples.

The receiver 100 further includes a positional signal processing logic 150 and a processor 160, which are configured to process the digitized baseband signal to extract the information and data bits conveyed in the RF signal. In one embodiment, the positional signal processing logic 150 can be embodied as, or can be integrated within, the processor 160. The processor 160 may have either internal or external memories, such as a cache for increasing the processing efficiency. The processor 160 can be interfaced to several other components, such as a number of memory units (e.g., random-access memory (RAM), read-only memory (ROM), or other type of memories) and input/output subsystems; however these components are not shown for the brevity of the description. These memories are used by the processor 160 to store positioning related information, such as ephemeris data, almanac data, last known position, and the like. The memories can also be configured to store program instructions to be executed by the processor 160. The processor 160 is also operatively connected to or coupled with an input/output subsystem in order to communicate with external devices.

In this embodiment of the present technology, the receiver 100 includes a test circuit 170. In an embodiment, the test circuit 170 is implemented as an on-board design or built-in to the navigation system receiver 100. Alternatively, the test circuit 170 may instead be coupled with or connected to navigation system receiver 100.

The test circuit 170 is configured to receive a test signal, and to facilitate determination of drift associated with the receiver clock based on detection and tracking of the test signal. In one embodiment, the test signal includes at least one continuous wave (CW) signal, such as a sine wave signal. The CW signal is received from an external signal source communicably coupled with the receiver 100. In some embodiments, the test signal is radiated from a signal source to the navigation system receiver 100, so that the signal is picked up by the antenna 105. In another implementation, the test signal is connected to the front-end processing block 110 directly through a wired connection.

In some embodiments, the test circuit 170 receives samples of the test signal from an output of the front-end processing block 110. For instance, the test circuit 170 is coupled with or connected to the output of the ADC 145. The test circuit 170 is configured to receive the samples of the test signal comprising the CW signal. The test circuit 170 is further configured to determine an initial frequency offset associated with the receiver clock based on the received samples of the test signal. In one such embodiment, the test circuit 170 includes a frequency detection module configured to determine the initial frequency offset. In an embodiment, the frequency detection module performs a Fast Fourier Transformation (FFT) of the samples of the test signal to obtain a frequency domain representation of the test signal. Then, a peak associated with the CW signal in the frequency domain representation of the test signal is detected. The test circuit 170 is further configured to track a parameter of the CW signal using the initial frequency offset. For instance, the test circuit 170 is configured to track at least one of the frequency and phase of the CW signal using suitable components or circuitries, which include, but are not limited to, a frequency locked loop (FLL) and/or a phase locked loop (PLL). The test circuit 170 is further configured to provide the tracked information of the parameter to an external host to determine a drift profile associated with the receiver clock. For instance, the frequency of the CW signal is periodically reported for specified durations, and this report of frequency across time represents the drift profile associated with the receiver clock (e.g., the TCXO clock). In another embodiment, the reported frequency across time is provided to the external host for determination of the drift profile associated with the receiver clock.

The test circuit 170 can be implemented as interconnections of electronic elements and circuits, and modules such as an application specific integrated circuit (ASIC), a field programmable gate array (FPGA), a digital signal processor unit, a special-purpose chip, and the like. An exemplary embodiment of the test circuit 170 is further described in conjunction with FIG. 2.

Figure 2:
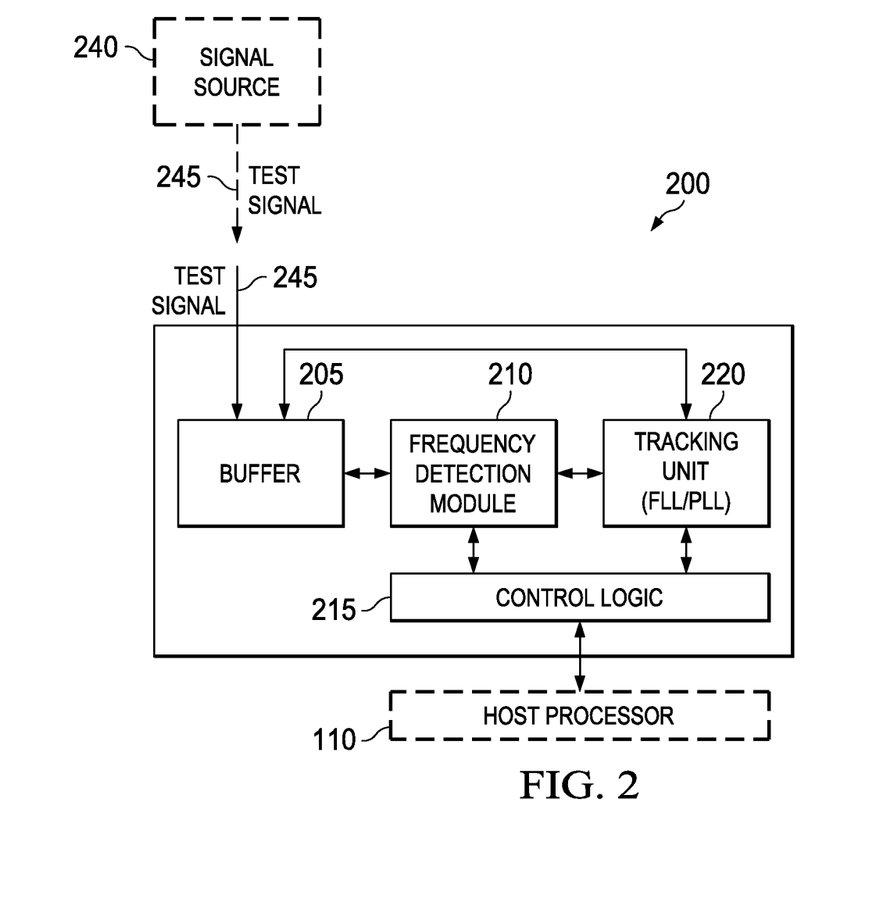
FIG. 2 is a block diagram of a drift profile determination test circuit used in a navigation system receiver according to an embodiment.

Referring now to FIG. 2, a drift profile determination test circuit 200 is shown, according to an embodiment. The drift profile determination test circuit 200 (hereinafter referred to as 'test circuit 200') is an example of the test circuit 170 according to an embodiment. Pursuant to one exemplary implementation, the test circuit 200 will be a built-in component of the navigation system receiver (e.g., a GPS receiver). In some exemplary embodiments, the test circuit 200 can be a separate entity and is capable of being coupled to the navigation system receiver for facilitating determination of the drift profile associated with the receiver clock of the navigation system receiver. Some of the components shown in the test circuit 200 can be optional, and its functionalities can be performed by other components, such as alone or jointly.

The test circuit 200 is communicably coupled or associated with a signal source 240 that is configured to provide a test signal 245 (including at least one CW signal, such as a sine wave signal) to the test circuit 200. In one form, the signal source 240 provides the test signal to the test circuit 200 using a wired connection. In other forms, the signal source 240 radiates the test signal, and an antenna, such as the antenna 105, can receive the test signal, which is fed to the test circuit 200 after processing by a front-end processing block (see, the front-end processing block 110).

The test circuit 200 includes a buffer 205 that is configured to collect received samples of the test signal. The buffer 205 can be implemented with any memory or data storage techniques. For instance, a series of registers capable of storing the samples of the test signal can be utilized for implementing the sample buffer 205. In the embodiment shown in FIG. 2, the test circuit 200 includes a frequency detection module 210 that is communicably coupled with or connected to the buffer 205. In one embodiment, the frequency detection module 210 comprises a FFT module. The FFT module is configured to receive samples of the test signal from the buffer 205. In some embodiments, the buffer 205 can be optional, and the samples of the test signal are directly fed to the frequency detection module 210.

The frequency detection module 210 (specifically, the FFT module present in the frequency detection module 210) is configured to perform FFT for generating a frequency domain representation (e.g., a frequency domain signal) corresponding to the received signal (e.g., a test signal comprising the CW signal) that is in the time domain. An FFT is an efficient algorithm to perform the Discrete Fourier Transformation (DFT), or the inverse transformation. In a signal analysis, the time domain is used to describe the changing of physical signals with respect to time, and the frequency domain is used to describe the changing of physical signals with respect to frequency. The frequency detection module 210 performs the FFT of the test signal to provide its output as frequency domain data of the test signal. In an embodiment, an injected tone in the test signal (e.g., a CW signal) is detected by the frequency detection module 210. In an embodiment, the injected tone of the CW signal is detected based on a peak in the output of the FFT module 210. In an embodiment, a center frequency of the detected peak in the output of the FFT module 210 provides the frequency of the CW signal.

The frequency detection module 210 is configured to calculate an initial frequency offset associated with the receiver clock for the CW signal. In one form, the initial frequency offset is calculated based on the detected peak of the CW signal and an expected location of the peak of the CW tone. For instance, a frequency of the CW signal in the test signal is already known, and an expected location of the peak can be determined. In an embodiment, the frequency detection module 210 is configured to calculate a difference between an expected location of the peak of the CW signal and the detected location of the peak of the CW tone, and the calculated difference is the initial frequency offset. In the embodiment shown in FIG. 2, the test circuit 200 includes a control logic 215 that is configured to receive the output of the frequency detection module 210.

In alternate embodiments, the frequency detection module 210 calculates the initial frequency offset through other means (not using FFT), such as by looking at the phase difference between successive samples of the received CW signal.

The test circuit 200 includes a tracking unit 220 for tracking a parameter such as at least one of a frequency and phase of the CW signal that is utilized for determining a drift profile associated with the receiver clock. Examples of the tracking unit 220 are a FLL or a PLL. The tracking unit 220, such as the FLL, is coupled with or connected to the frequency detection module 210 and the control logic 215.

In an embodiment, the control logic 215 is configured to initialize the tracking unit 220, such as the FLL, with the calculated initial frequency offset and cause the FLL to run a tracking loop on the CW signal to track the frequency of the CW signal. Similarly, in the embodiments where the tracking unit 220 is a PLL, the control logic 215 causes the PLL to run a tracking loop on the CW signal to track the phase of the CW signal. In one embodiment, the control logic 215 causes the FLL/PLL to track the CW signal for a pre-defined time interval. In another embodiment, the control logic 215 periodically reports the frequency/phase of the CW signal for the determination of the receiver clock (e.g., the TCXO clock). The report of frequency and/or phase across time represents the drift profile of the TCXO clock. In yet another embodiment, the drift profile associated with the receiver clock is measured in parts per million (ppm) or parts per billion (ppb). Herein, a single part per million represents a frequency drift of 1 hertz (Hz) in the frequency of the TCXO clock whose nominal frequency is 1 Mega Hertz (MHz), and a single part per billion represents a drift of 1 mHz (millihertz) for the TCXO clock having nominal frequency of 1 MHz.

Figure 3:
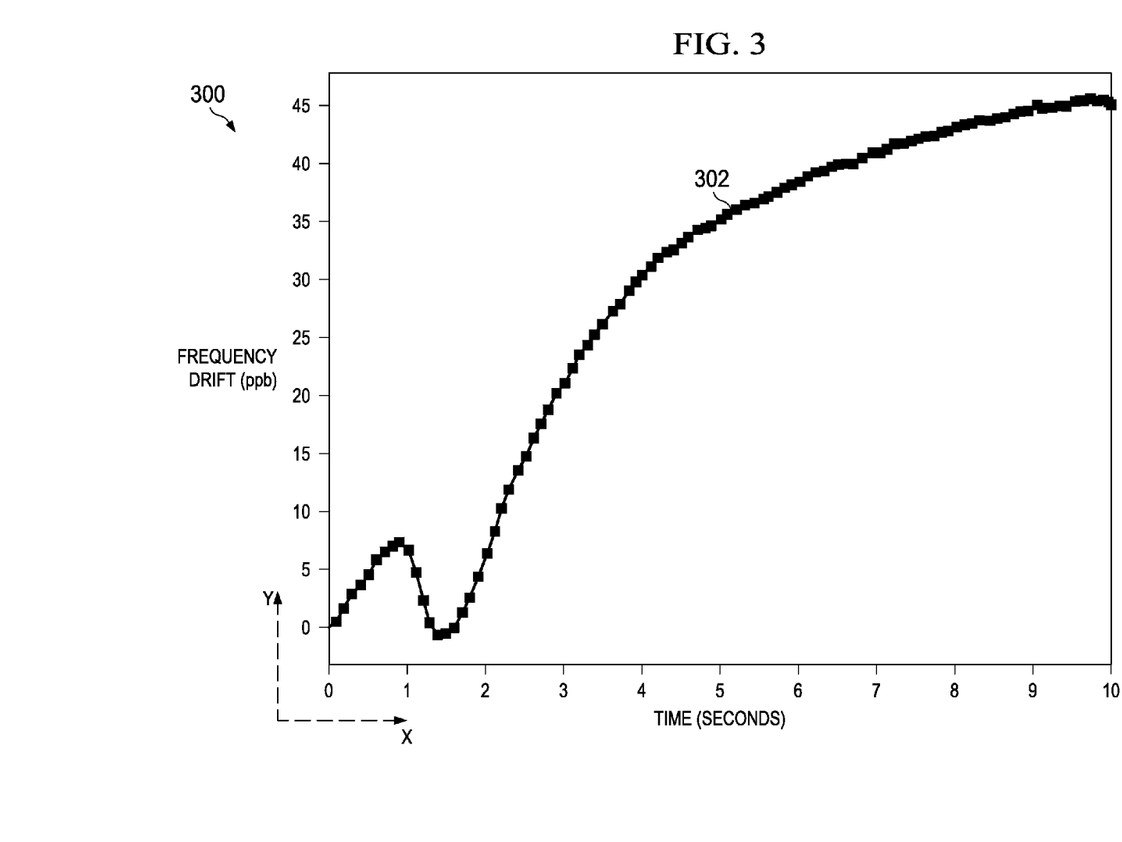
FIG. 3 is an exemplary plot of a typical drift profile across time.

In some embodiments, the control logic 215 is configured to be communicably coupled or associated with a host processor 250 that can receive the tracked information of the parameter with respect to the time. In such embodiments, the host processor 250 is configured to determine the drift profile associated with the receiver clock based on the tracked parameter. In some embodiments, the control logic 215 is not present in the test circuit 200, and the functionalities of the control logic 215 are performed by the host processor 250. In these embodiments, the host processor 250 is directly coupled with or connected to the frequency detection module 210 and the tracking unit 215. In some embodiments, a test mode is commanded through software messages from the host processor 250, which in turn invokes the test circuit 200 in the navigation system receiver to track the CW signal, and the tracked information is received by the host processor 250 to determine the drift profile associated with the receiver clock (e.g., a TCXO clock). An illustrative picture of a typical drift profile across time is shown in FIG. 3. Referring now to FIG. 3, an example of frequency drift of the clock in ppb over a 10 second duration, is shown. A plot 302 represents a drift profile illustrated along across the time (X-axis) and the frequency drift in ppb (Y-axis).

Referring again to FIG. 2, it should be noted that the tracking unit 220 is explained by the examples of the FLL and PLL. However, such a description is presented as an example. Indeed, the tracking unit is not restricted to the FLL and PLL, and various possible configurations of the tracking unit can be implemented. Further, the tracking unit 220, frequency detection module 210 and the control logic 215 can be implemented using any, or a combination of, an ASIC, a FPGA, a digital signal processor unit, a special-purpose chip, and the like, with or without computer program instructions.

Figure 4:
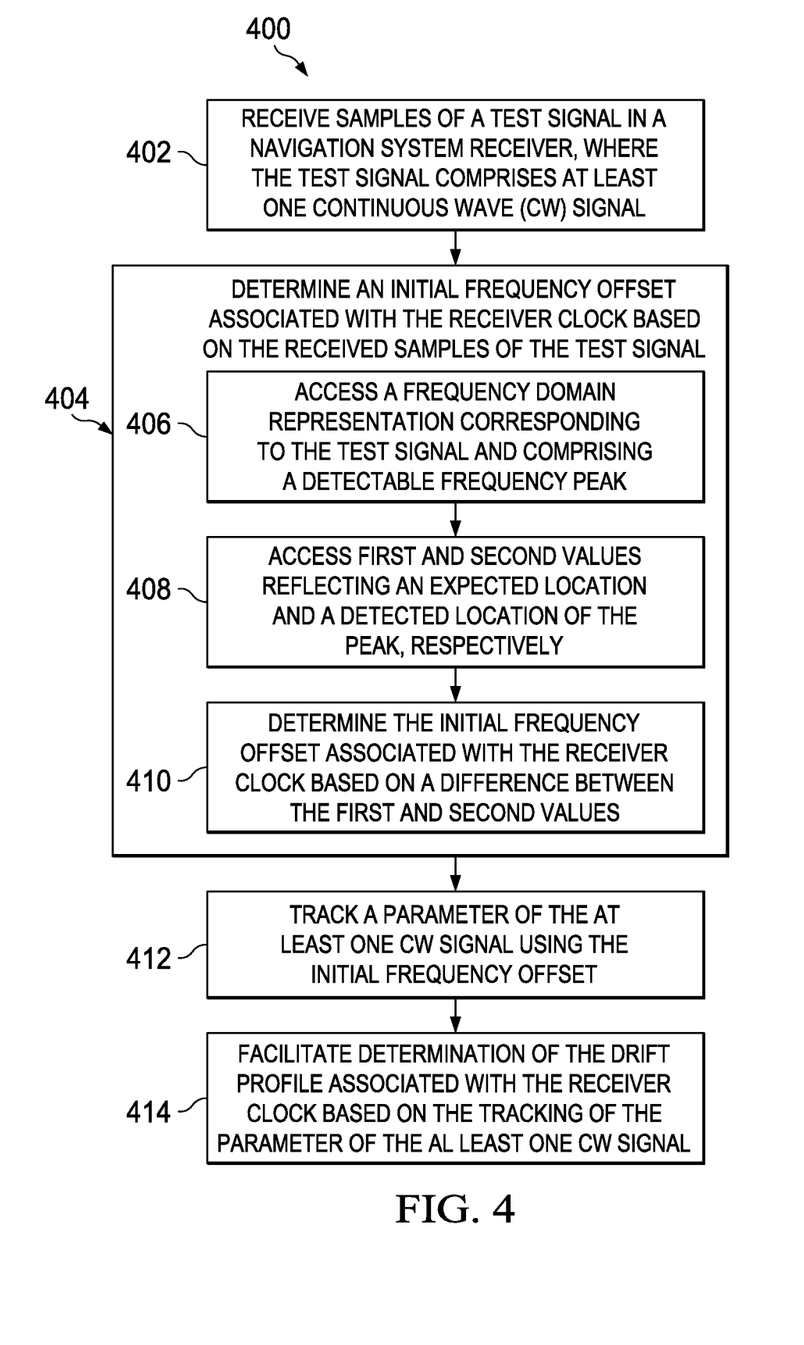
FIG. 4 is a flow diagram of a method for facilitating determination of a receiver clock drift in a navigation system receiver according to an embodiment.

FIG. 4 is a flowchart illustrating the manner in which determination of a drift profile of a receiver clock in a navigation system receiver is facilitated, in an embodiment of the present technology. For purposes of illustration, the flowchart is described with respect to the device and components of FIGS. 1 and 2, and in relation to a navigation system receiver including a test circuit for facilitating determination of the drift profile associated with the receiver clock. However, various features described herein can be implemented in other environments and using other components. Furthermore, the steps in the flowchart are described in a specific sequence for purposes of illustration. Alternative embodiments using a different sequence of steps can also be implemented without departing from the scope and spirit of several aspects of the present technology.

At 402, the method 400 includes receiving samples of a test signal in a navigation system receiver. In one embodiment, the test signal comprises at least one CW signal. As described in conjunction with FIG. 2, the test signal is received from an external signal source through a direct wired connection, or is received as radiation. In another embodiment, the test signal is received by an RF antenna, or by a wired connection, coupled or associated with the navigation system receiver (e.g., a GPS receiver). In an embodiment, the CW signal is a sine wave signal and has a center frequency.

At 404, the method 400 includes determining an initial frequency offset of the receiver clock based on the received samples of the test signal. In one embodiment, the initial frequency offset is determined by blocks 406, 408 and 410. At 406, the method 400 includes accessing a frequency domain representation comprising a detectable frequency peak corresponding to the test signal. The frequency domain representation is obtained by performing a FFT of the test signal. At 408, the method 400 includes accessing first and second values reflecting an expected location and a detected location of the peak, respectively. The first value corresponds to the expected location of the peak corresponding to the CW signal. Since, the frequency of the CW signal is known, the expected location of the peak is already known and is accessed. The second value corresponds to the detected location of the peak corresponding to the CW signal in the frequency domain representation. At 410, the method 400 includes determining an initial frequency offset associated with the receiver clock for the CW signal. The initial frequency offset is determined based on the difference between the first and the second values. For instance, in one embodiment, the initial frequency offset is calculated as a difference between an expected location of the peak of the CW signal and the detected location of the peak of the CW signal.

At 412, the method 400 includes tracking a parameter of the CW signal using the initial frequency offset. The parameter is at least one of a frequency and phase of the CW signal. For instance, as described in conjunction with FIG. 2, the frequency and/or phase of the CW signal is tracked by a FLL and/or a PLL. In an embodiment, the initial frequency offset is also a parameter and it is also tracked. Herein, tracking of the initial frequency offset refers to periodically determining the frequency offset from the received CW signal. In some embodiments, the frequency offset is determined at pre-defined or customized non-periodic intervals as well.

Further, at 414, the method 400 includes facilitating determination of the drift profile associated with the receiver clock based on the tracking of the parameter of the CW signal. For instance, the frequency of the CW signal is tracked with respect to time, for example, for a pre-defined interval. The tracked frequency of the CW signal is reported with respect to the time for determining/characterizing the drift profile associated with the receiver clock (e.g., the TCXO clock). In some embodiments, the tracked values of the parameters such as the frequency and phase are provided to an external processing/computing device such as the host processor 110. In these embodiments, the tracked values of the parameter with respect to time are utilized by the host processor 110 to determine the drift profile associated with the receiver clock.

At 414, the method 400 facilitates determination of the drift profile associated with the receiver clock based on the tracking of the initial frequency offset. The initial frequency offset is tracked over time by periodically determining the frequency offset from the received CW signal and drift profile associated with the receiver clock is determined by the tracked frequency offset values. The tracked values of the frequency offset are provided to the external processing/computing device such as the host processor 110 that utilizes these values to determine the drift profile associated with the receiver clock.

Without in any way limiting the scope, interpretation, or application of the claims appearing below, advantages of one or more of the exemplary embodiments disclosed herein is to provide a test circuit that can be integrated in a navigation system receiver. Various embodiments provide facilitating determination of a drift profile of a receiver clock, such as a TCXO clock, in a simple and easy to use manner, since the test circuit is already integrated in the device platform. Various embodiments do not involve expensive and bulky external equipment, and hence do not have difficulties associated with compact form-factor phone platforms. Various embodiments of the present technology enable the determination of the drift profile during stages such as factory production testing and bench characterization. A test mode is commanded through software messages from a host processor, which in turn invokes the test circuit in the navigation system receiver for reporting the drift profile associated with the receiver clock. Such a process is scalable for mass testing of navigation system receivers during factory production stages. Various embodiments of the present technology help in the design stage of the navigation system receivers, for example, if the determined drift associated with a receiver clock exceeds a certain limit that might impact the performance of the corresponding navigation system receiver, mitigation action can be taken. Such mitigation actions include, but are not limited to, a board design optimization, TCXO placement change and thermal shielding. The test circuits and methods provided in conjunction with the present technology facilitate such determination of the clock drift.

It should be noted that reference throughout this specification to features, advantages, or similar language does not imply that all of the features and advantages should be, or are in, any single embodiment. Rather, language referring to the features and advantages is understood to mean that a specific feature, advantage, or characteristic described in connection with an embodiment is included in at least one embodiment of the present technology. Thus, discussions of the features and advantages, and similar language, throughout this specification may, but do not necessarily, refer to the same embodiment.

Various embodiments of the present disclosure, as discussed above, may be practiced with steps and/or operations in a different order, and/or with hardware elements in configurations which are different than those which are disclosed. Therefore, although the technology has been described based upon these exemplary embodiments, it is noted that certain modifications, variations, and alternative constructions are apparent and well within the spirit and scope of the technology.

Although various exemplary embodiments of the present technology are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A navigation system receiver, comprising:
a clock source configured to generate a receiver clock for the navigation system receiver; and
a test circuit coupled with the clock source, configured to facilitate determination of a drift profile associated with the receiver clock based on a detection and tracking of a test signal received by the test circuit, wherein the test signal comprises at least one continuous wave (CW) signal.

2. A navigation system receiver, comprising:
a clock source configured to generate a receiver clock for the navigation system receiver; and
a test circuit coupled with the clock source, configured to facilitate determination of a drift profile associated with the receiver clock based on a detection and tracking of a test signal received by the test circuit, wherein the test signal comprises at least one continuous wave (CW) signal, wherein the test circuit comprises:
a buffer configured to receive samples of the test signal;
a frequency detection module, coupled with the buffer and operable on the received samples of the test signal, configured to calculate an initial frequency offset associated with the receiver clock for the at least one CW signal; and
a tracking unit for tracking at least one of a frequency and a phase of the at least one CW signal for facilitating the determination of the drift profile associated with the receiver clock.

3. The navigation system receiver of claim 2, wherein the tracking unit is one of a frequency locked loop and a phase locked loop.

4. The navigation system receiver of claim 2, wherein the frequency detection module is configured to:
calculate a frequency domain representation of the received samples of the test signal, to detect a peak associated with the at least one CW signal in the frequency domain representation; and
determine the initial frequency offset based on the detected peak associated with the at least one CW signal and an expected peak of the at least one CW signal.

5. The navigation system receiver of claim 2, further comprising a control logic, coupled with the frequency detection module and the tracking unit, configured to:
control the frequency detection module in order to obtain the initial frequency offset; and
control the tracking unit for tracking at least one of the frequency and the phase of the at least one CW signal with respect to time for determining the drift profile associated with the receiver clock.

6. The navigation system receiver of claim 5, wherein the tracking unit is configured to track at least one of the frequency and the phase for a pre-defined time interval and output at least one of the tracked frequency and the tracked phase to an external host processor for determining the drift profile associated with the receiver dock.

7. The navigation system receiver of claim 1, wherein the clock source comprises one of a Temperature Compensated Crystal Oscillator (TCXO) and a crystal oscillator.

8. The navigation system receiver of claim 4, wherein the frequency domain representation of the received samples of the test signal is obtained using a Fast Fourier Transform (UT) operation.

9. A method of drift profile determination, the method comprising:
receiving samples of a test signal in a navigation system receiver, wherein the test signal comprises at least one continuous wave (CW) signal;
determining an initial frequency offset associated with the receiver clock based on the received samples of the test signal;
tracking a parameter of the at least one CW signal using the initial frequency offset; and
facilitating a determination of a drift profile associated with the receiver clock based on the tracking of the parameter of the at least one CW signal.

10. The method of claim 9, wherein the determination of initial frequency offset comprises:
accessing a frequency domain representation corresponding to the test signal and comprising a detectable frequency peak;
accessing first and second values reflecting an expected location and a detected location of the peak, respectively; and
determining an initial frequency offset associated with the receiver clock based on a difference between the first and second values.

11. The method of claim 9, wherein accessing the frequency domain representation comprises performing a Fast Fourier Transformation (FFT) of the test signal to obtain the frequency domain representation of the test signal, and wherein the detectable peak is associated with the at least one CW signal in the frequency domain representation.

12. The method of claim 9, wherein the parameter is at least one of a frequency and a phase of the at least one CW signal.

13. The method of claim 9, wherein tracking the parameter comprises tracking the frequency of the at least one CW signal for a pre-defined time interval for facilitating the determination of the drift profile associated with the receiver clock.

14. The method of claim 9, wherein the receiver clock is one of a Temperature Compensated Crystal Oscillator (TCXO) clock and a clock generated from a crystal oscillator.

15. A drift profile determination test circuit capable of being integrated in a navigation system receiver, the test circuit comprising:
a frequency detection module, operable on the received samples of a test signal, configured to provide an frequency offset associated with the receiver clock for at least one CW signal; and
a tracking unit coupled with the frequency detection module and configured to track a parameter of the test signal with respect to time using the initial frequency offset associated with the receive clock, the parameter being associated with a drill profile corresponding to the receiver clock.

16. The drift profile determination test circuit of claim 15, wherein the frequency detection module further comprises a FFT module configured to receive samples of the test signal and calculate a frequency domain representation of the test signal.

17. The drift profile determination test circuit of claim 15, wherein the parameter is at least one of frequency and phase of the at least one CW signal, and the tracking unit is one of a frequency locked loop and a phase locked loop.

18. The drift profile determination test circuit of claim 15, wherein the frequency detection module is configured to detect a peak associated with the at least one CW signal in a frequency domain representation, wherein the initial frequency offset is calculated based on the detected peak associated with the at least one CW signal and an expected peak of the at least one CW signal.

19. The drift profile determination test circuit of claim 15, further comprising a control logic, coupled with the frequency detection module and the tracking unit, configured to:
- control the frequency detection module in order to calculate the initial frequency offset; and
- control the tracking unit for tracking at least one of the frequency and the phase of the at least one CW signal with respect to time for facilitating determination of the drift profile associated with the receiver clock, wherein the tracking unit is configured to track at least one of the frequency and the phase for a pre-defined time interval for determining the drift profile.

20. The drift profile determination test circuit of claim 15, wherein the receiver clock source is one of a Temperature Compensated Crystal Oscillator (TCXO) clock and a crystal oscillator.

* * * * *